(12) United States Patent
Ikeda

(10) Patent No.: US 9,904,988 B2
(45) Date of Patent: Feb. 27, 2018

(54) IMAGE PROCESSING METHOD AND IMAGE PROCESSING PROGRAM

(71) Applicant: TOSHIBA MEMORY CORPORATION, Minato-ku, Tokyo (JP)

(72) Inventor: Takahiro Ikeda, Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 15/251,659

(22) Filed: Aug. 30, 2016

(65) Prior Publication Data

US 2017/0262963 A1    Sep. 14, 2017

(30) Foreign Application Priority Data

Mar. 11, 2016    (JP) ................................. 2016-048679

(51) Int. Cl.
G06K 9/40 (2006.01)
G06T 5/00 (2006.01)
G06T 7/00 (2017.01)

(52) U.S. Cl.
CPC ............ *G06T 5/002* (2013.01); *G06T 7/0085* (2013.01); *G06T 2207/10061* (2013.01); *G06T 2207/20192* (2013.01)

(58) Field of Classification Search
CPC ............ G01J 3/0272; G01J 2005/0077; G01J 5/0265; G06T 7/12
USPC ....... 382/145, 164, 170, 171, 190, 209, 266, 382/269, 274, 275; 358/2.26, 3.27, 537, 358/538
See application file for complete search history.

(56) References Cited

U.S. PATENT DOCUMENTS

| 5,748,778 A | 5/1998 | Onoguchi |
| 6,208,417 B1 * | 3/2001 | Itagaki ................... G01N 21/88 356/237.2 |
| 8,009,224 B2 | 8/2011 | Umeda |
| 8,269,722 B2 * | 9/2012 | Wu ..................... G06K 9/00375 345/158 |
| 8,290,263 B2 * | 10/2012 | Tsuruoka ............... H04N 1/407 348/222.1 |

(Continued)

FOREIGN PATENT DOCUMENTS

| JP | 2002-247611 A | 8/2002 |
| JP | 2006-031636 A | 2/2006 |

(Continued)

OTHER PUBLICATIONS

TAM: "A theoretical analysis of an alternative CUSUM statistic called CUSUM-slope for detecting signals from background noise in a low signal-to-noise environment", BMC Neuroscience, 10(Supp I):P83, Jul. 2009, 1 page.

*Primary Examiner* — Yosef Kassa
(74) *Attorney, Agent, or Firm* — Foley & Lardner LLP

(57) ABSTRACT

In an image processing method, first, one point is designated on input image data as a start point of a retrieval line by external input. Subsequently, one point, which is different from the start point, is designated on the input image data as an endpoint of the retrieval line by the external input. Subsequently, a cumulative line profile of the retrieval line is prepared by calculating a cumulative sum of luminance values on the retrieval line. Subsequently, an edge position on the retrieval line is calculated based on the cumulative line profile of the retrieval line.

17 Claims, 15 Drawing Sheets

(56) References Cited

U.S. PATENT DOCUMENTS

| | | | | |
|---|---|---|---|---|
| 8,320,634 B2* | 11/2012 | Deutsch | ............. | G06K 9/00624 |
| | | | | 382/103 |
| 8,462,988 B2* | 6/2013 | Boon | ................. | G06K 9/00798 |
| | | | | 382/103 |
| 8,553,037 B2* | 10/2013 | Smith | ..................... | G06T 13/40 |
| | | | | 345/473 |
| 8,693,777 B2* | 4/2014 | Ha | ....................... | H04N 1/4092 |
| | | | | 348/234 |
| 2013/0278801 A1* | 10/2013 | Sawada | ................. | G06T 3/4015 |
| | | | | 348/242 |

FOREIGN PATENT DOCUMENTS

| | | |
|---|---|---|
| JP | 2007-026320 A | 2/2007 |
| JP | 2007-102580 A | 4/2007 |
| JP | 2007-190288 A | 8/2007 |
| JP | 2012-113438 A | 6/2012 |

* cited by examiner

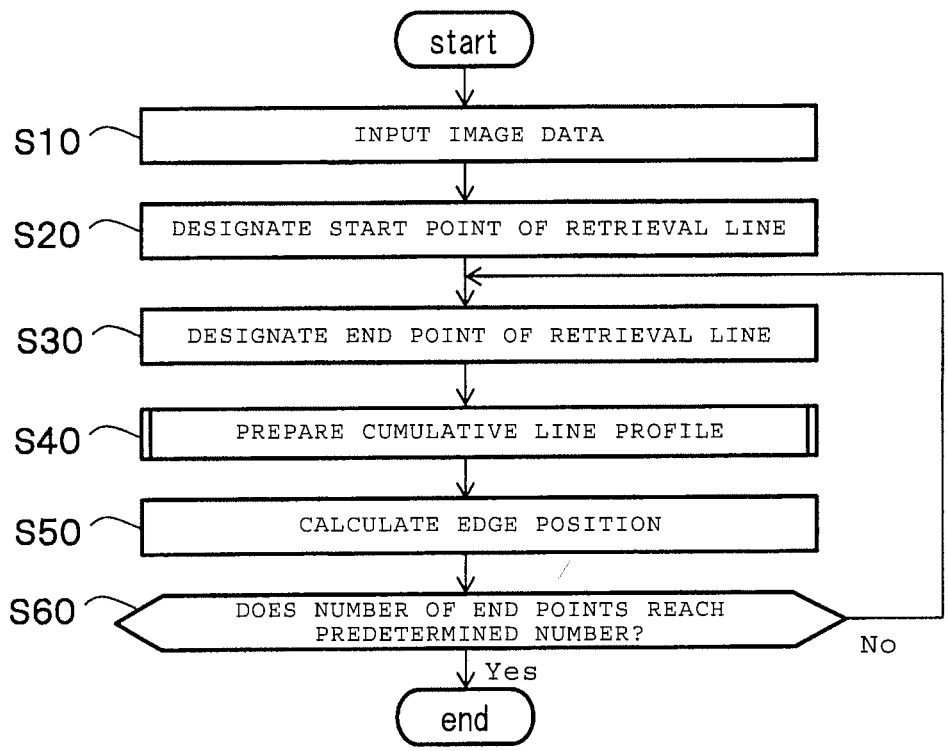
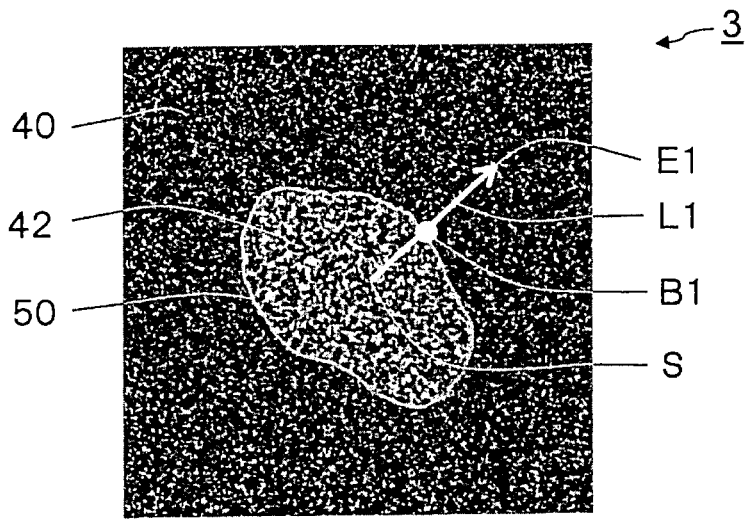

FIG. 15D
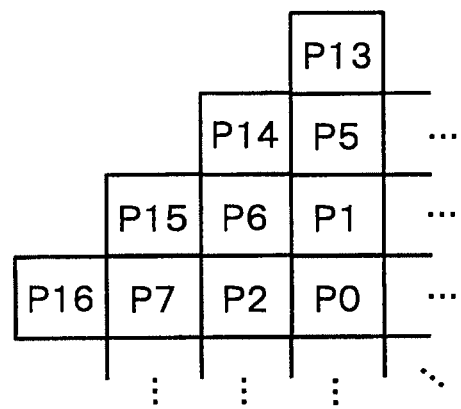
FIG. 16
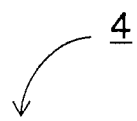
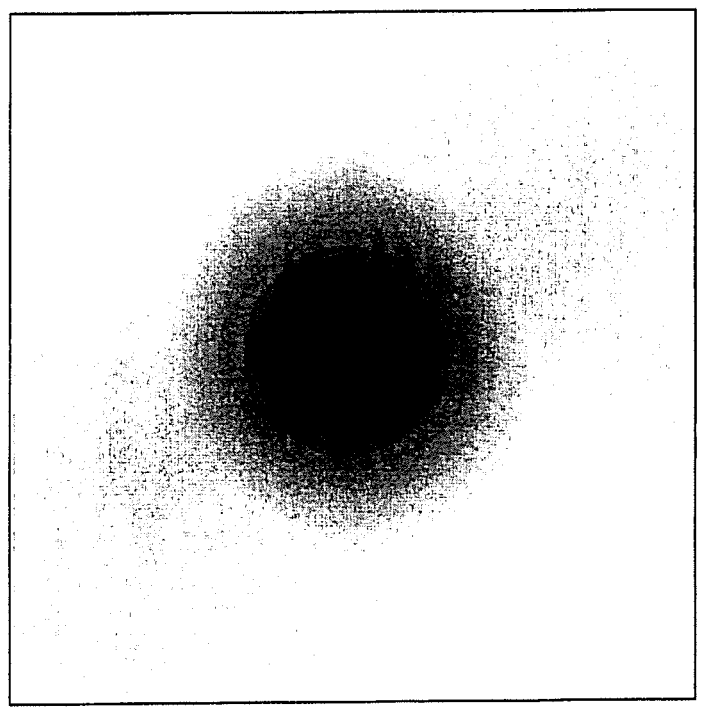

IMAGE PROCESSING METHOD AND IMAGE PROCESSING PROGRAM

CROSS-REFERENCE TO RELATED APPLICATION

This application claims the benefit of and priority to Japanese Patent Application No. 2016-048679, filed Mar. 11, 2016, the entire contents of which are incorporated herein by reference.

FIELD

Embodiments described herein relate generally to an image processing method and an image processing program.

BACKGROUND

With the advancement of an aberration correction technology, a Transmission Electron Microscope (TEM) and a Scanning Transmission Electron Microscope (STEM), which include an optical image forming system, are utilized as a device for observation of a semiconductor integrated circuit. In image data, which is observed by such a device, noise is mixed due to various factors. Therefore, a noise removal process or a noise reduction process may be performed. Improvements in such noise removal/reduction processes remain desired.

SUMMARY

In some embodiments according to one aspect, an image processing method may include designating one point on input image data as a start point of a retrieval line. The input image data contains an image of a subject. One point, which is different from the start point, may be designated on the input image data as an end point of the retrieval line. A cumulative line profile of the retrieval line may be prepared by calculating a cumulative sum of luminance values on the retrieval line. An edge position on the retrieval line may be calculated based on the cumulative line profile of the retrieval line such that the edge position corresponds to a boundary of the subject in the input image data.

In some embodiments according to another aspect, a non-transitory computer-readable storage medium may store instructions as an image processing program executable by a processor to store input image data, which is imaged by an imaging device, in a storage device, the input image data containing an image of a subject. According to the instructions, one point on the input image data may be designated as a start point of a retrieval line. One point, which is different from the start point, on the input image data may be designated as an end point of the retrieval line. A cumulative line profile of the retrieval line may be prepared based on luminance values on the retrieval line. An edge position on the retrieval line may be calculated based on the cumulative line profile of the retrieval line. The calculated edge position may be stored in the storage device. A boundary of the subject in the input image data may be detected based on the calculated edge position.

In some embodiments according to still another aspect, an image processing device may include a processor and a memory connected to the processor. The memory may store instructions executable by the processor to designate one point on input image data as a start point of a retrieval line. The input image data contains an image of a subject. According to the instructions, one point, which is different from the start point, on the input image data may be designated as an end point of the retrieval line. A cumulative line profile of the retrieval line may be prepared by calculating a cumulative sum of luminance values on the retrieval line. An edge position on the retrieval line may be calculated based on the cumulative line profile of the retrieval line. A boundary of the subject in the input image data may be detected based on the calculated edge position.

Other aspects and embodiments of the disclosure are also encompassed. The foregoing summary and the following detailed description are not meant to restrict the disclosure to any particular embodiment but are merely meant to describe some embodiments of the disclosure.

DESCRIPTION OF THE DRAWINGS

FIG. 3 is a flowchart illustrating the flow of an image process according to some embodiments.

FIG. 4 is a diagram illustrating an example of a retrieval line and an edge position according to some embodiments.

FIG. 15A, FIG. 15B, FIG. 15C and FIG. 15D are diagrams illustrating an example of preparation of a cumulative sum image according to some embodiments.

FIG. 16 is a model diagram illustrating an example of a cumulative sum image.

DETAILED DESCRIPTION

In image data, which is observed by a device for observation of a semiconductor integrated circuit, e.g., a Transmission Electron Microscope (TEM) and a Scanning Transmission Electron Microscope (STEM), noise is mixed due to various factors. Therefore, a noise removal process and a noise reduction process may be performed according to noise occurrence factors such as the preprocessing of a process of detecting a boundary position of a subject and a process of digitizing a geometry parameter from the image data observed by the device.

However, the noise randomly occurs on a two-dimensional space and generally includes bright sections and dark sections which have areas extending over several number of pixels. Furthermore, the distribution of the noise on the two-dimensional space is determined according to photographing conditions. Therefore, it is hard to remove the noise through filtering processes, such as a median filter and time average, which are typically performed to preprocess the image data acquired by a Scanning Electron Microscope (SEM) or the like.

According to some embodiments, there is provided an image processing method which is capable of performing outline extraction and area division on image data which is acquired by a high-resolution electron microscope having an optical image forming system and in which noise is mixed.

According to some embodiments, in an image processing method, first, one point may be designated on input image data as a start point of a retrieval line by external input. Subsequently, one point, which is different from the start point, may be designated on the input image data as an end point of the retrieval line by the external input. Subsequently, a cumulative line profile of the retrieval line may be prepared by calculating a cumulative sum of luminance values on the retrieval line. Subsequently, an edge position on the retrieval line may be calculated based on the cumulative line profile of the retrieval line.

Hereinafter, embodiments of the disclosure will be described with reference to the accompanying drawings. The embodiments described herein do not limit the disclosure.

An image processing method according to some embodiments allows an edge position on a retrieval line to be extracted and a subject profile to be extracted by obtaining a cumulative value of luminance values on the retrieval line which is selected on input image data and calculating a point at which the slope of the cumulative value changes. More specifically, the image processing method will be described below.

Figure 1:
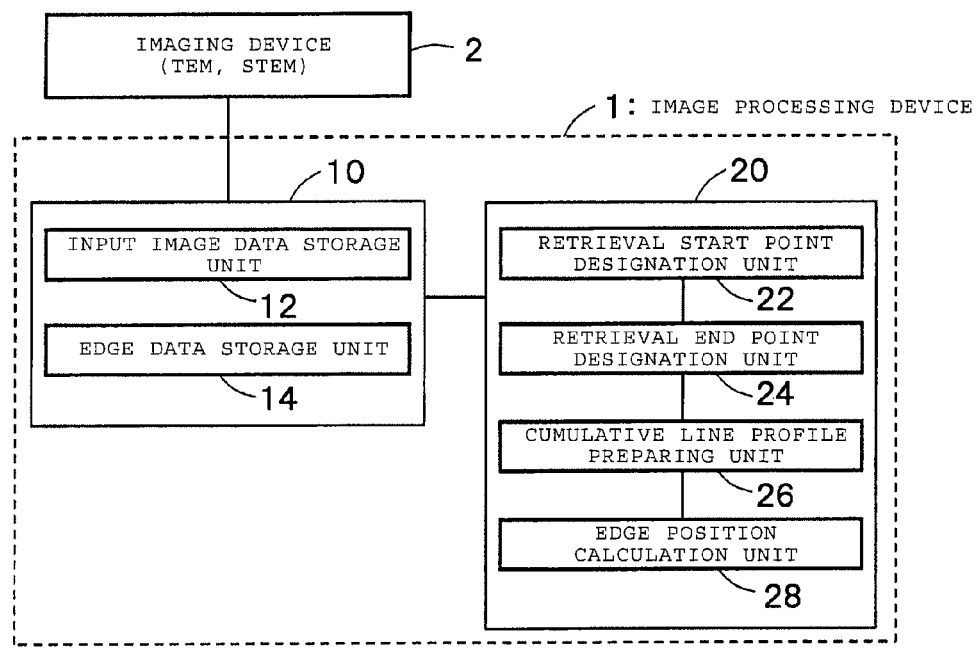
FIG. 1 is a block diagram illustrating the outline of an image processing system according to some embodiments.

FIG. 1 is a block diagram illustrating the outline of an image processing system according to some embodiments. The image processing system includes an image processing device 1 and an imaging device 2. In some embodiments, the image processing device 1 receives input image data, which is input from the imaging device 2 through an input Interface (I/F) which is not illustrated in the drawing, and calculates edge data. The image processing device 1 includes a data storage unit 10 and an image processing unit 20. The imaging device 2 includes an imaging device, such as a TEM and a STEM, and outputs the input image data to the image processing device 1. In some embodiments, the imaging device 2 may output various parameters and the like, together with the input image data, in addition to the input image data.

The data storage unit 10 stores input/output data of the image processing device 1 and data used for image processing. The data storage unit 10 includes an input image data storage unit 12 and an edge data storage unit 14. In some embodiments, a storage device, such as a hard disk drive (HDD) or a semiconductor memory, is used for the data storage unit 10. In some embodiments, the image processing unit 20 is implemented by executing a software module on a microprocessor of the image processing device 1 (see FIG. 17).

The input image data storage unit 12 stores the image data, which is output from the imaging device 2, as the input image data. In some embodiments, the edge data storage unit 14 stores the edge data which is extracted by the image processing unit 20 from the input image data. The storage units may be any one as long as the storage units can store the data for a desirable duration of time, and include at least one of a volatile memory and a non-volatile memory.

Figure 2:
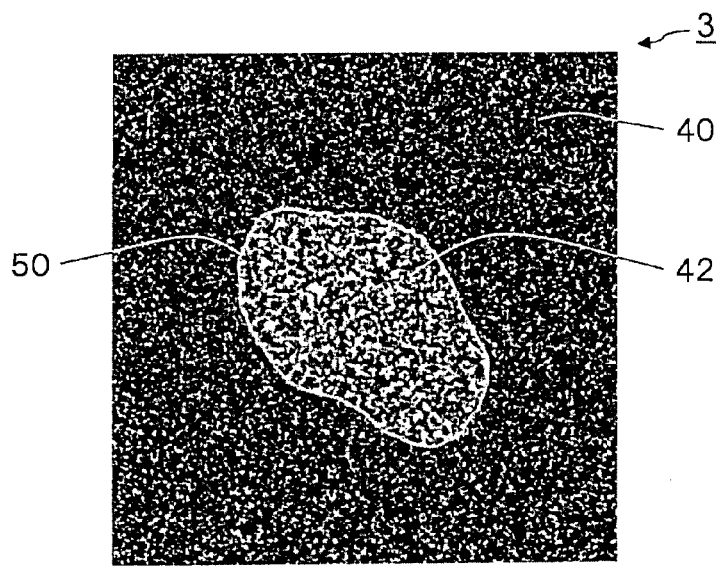
FIG. 2 is a diagram illustrating an example of an input image.

FIG. 2 is a diagram illustrating an example of an input image 3 of the image processing method according to some embodiments. In FIG. 2, the input image 3 illustrates a condition in which a subject 42 exists in, or is adjacent to, a subject 40 and the subject 42 and the subject 40 have different physical properties. Since the subject 42 and the subject 40 have different physical properties, the subject 40 is imaged as a dark area and the subject 42 is imaged as a bright area compared to the subject 40. An image similar to the input image 3 is photographed by the imaging device 2, and is input to the input image data storage unit 12 of the image processing device 1. In some embodiments, edge data 50, which is the boundary between the subject 42 and the subject 40, is extracted by the image processing unit 20, and the edge data is stored in the edge data storage unit 14.

Returning to FIG. 1, the image processing unit 20 extracts the edge data from the input image data which is stored in the input image data storage unit 12. The image processing unit 20 includes a retrieval start point designation unit 22, a retrieval end point designation unit 24, a cumulative line profile preparing unit 26, and an edge position calculation unit 28.

In some embodiments, the retrieval start point designation unit 22 designates one point on the input image data as the start point of a retrieval line through external input (e.g., through a graphical user interface and/or a physical input interface (or device) like a keyboard or a mouse). In some embodiments, the retrieval line is a segment for obtaining an edge, and is a segment which is set to cross between areas having different physical properties in the input image 3. The start point may be designated by a user as the external input, and may be designated by a predetermined procedure. For example, it may be assumed that a subject exists around the center of an image and the center of an input image may be designated as the start point by a computer program (e.g., instructions executable by a processor to perform such designation of the start point). In some embodiments, the external input by the user is performed through an input interface (I/F) which is not illustrated in the drawing and may be a graphical user interface and/or a physical input interface (or device).

In some embodiments, the retrieval end point designation unit 24 designates one point, which is different from the start point, on the input image data as the endpoint of the retrieval line through the external input. The endpoint is designated to cross the boundary of areas, which have different physical properties. Similarly to the designation of the start point, in some embodiments, the end point may be designated by the user as the external input, or may be designated by a predetermined procedure.

In some embodiments, the cumulative line profile preparing unit 26 prepares the cumulative line profile of the retrieval line based on the luminance values of pixels on the retrieval line in the input image 3. In some embodiments, the cumulative line profile is obtained by extracting a cumulative sum of the luminance values on the retrieval line for each predetermined section from the start point toward the endpoint of the retrieval line.

In some embodiments, the edge position calculation unit 28 calculates an edge position on the retrieval line based on the cumulative line profile. Furthermore, the edge position calculation unit 28 stores the calculated edge position as edge data in the edge data storage unit 14. In some embodiments, the edge position calculation unit 28 calculates a bent position of the cumulative line profile of the retrieval line, and calculates the bent position as the edge position.

Subsequently, the image processing method according to some embodiments will be described. FIG. 3 is a flowchart illustrating the flow of a process in the image processing method according to some embodiments. In addition, FIG. 4 is a diagram illustrating the retrieval line or the like in the input image data.

First, as illustrated in FIG. 3, the image data, which is captured by the imaging device 2, is input as the input image data to the image processing device 1 (step S10). In some embodiments, the input image data is stored in the input image data storage unit 12. For example, an image, such as the input image 3 illustrated in FIG. 2, is input as the input image data.

Subsequently, the retrieval start point designation unit 22 designates the start point of the retrieval line (step S20). For example, a start point S illustrated in FIG. 4 is designated as the start point.

Subsequently, the retrieval end point designation unit 24 designates the end point of the retrieval line (step S30). For example, an end point E1 illustrated in FIG. 4 is designated as the end point. A retrieval line L1 is designated by designating the start point S and the end point E1.

Subsequently, the cumulative line profile preparing unit 26 prepares the cumulative line profile of the retrieval line L1 (step S40). A cumulative line profile preparing according to some embodiments will be described below in detail.

Figure 5A:
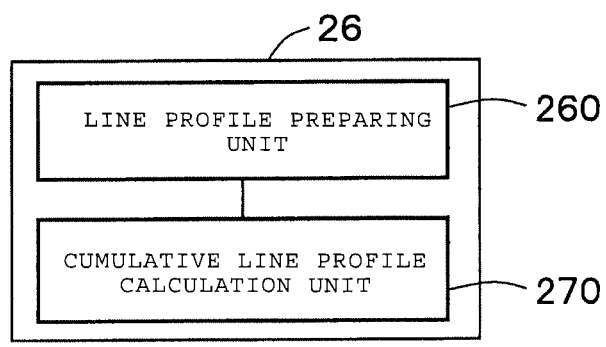
FIG. 5A is a diagram illustrating the outline of a cumulative line profile preparing unit according to some embodiments.
Figure 5B:
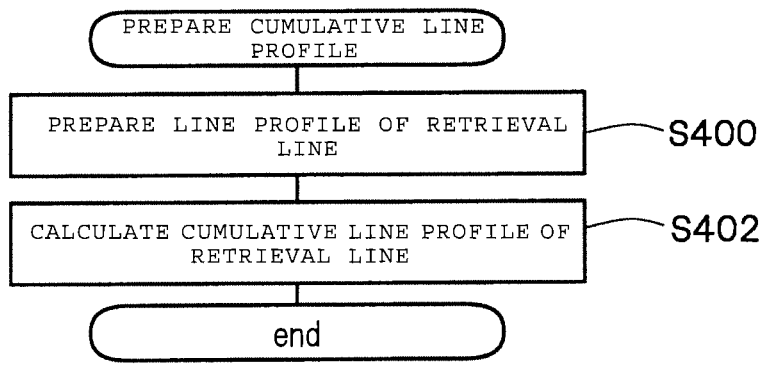
FIG. 5B is a flowchart illustrating the process thereof.

FIG. 5A is a block diagram illustrating the cumulative line profile preparing unit 26 according to some embodiments. As illustrated in FIG. 5A, the cumulative line profile preparing unit 26 includes a line profile preparing unit 260 and a cumulative line profile calculation unit 270. In addition, FIG. 5B is a flowchart illustrating the process flow of preparing the cumulative line profile according to some embodiments.

Figure 6:
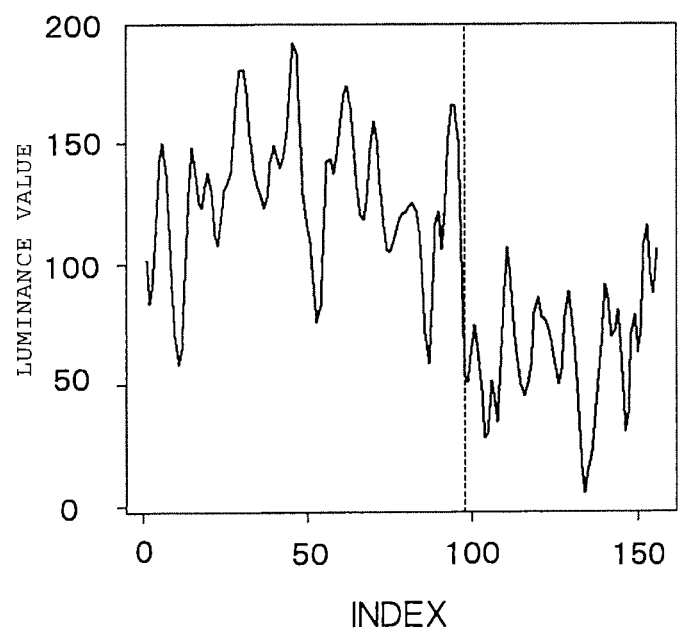
FIG. 6 is a diagram illustrating an example of line profile.

In the process of preparing the cumulative line profile, first, the line profile preparing unit 260 prepares the line profile of the retrieval line L1 (step S400). In some embodiments, the line profile is obtained by extracting the luminance values of pixels through which the retrieval line L1 on the input image 3 passes. The graph shown in FIG. 6 is obtained by extracting the line profile of the retrieval line L1 of FIG. 4. A horizontal axis represents an index which visually indicates the number of pixels from the start point S, and a vertical axis represents a luminance value. In addition, a dotted line indicates the edge position.

In some embodiments, the line profile may be obtained by obtaining the luminance value of a pixel in a location moved by one index, which is the width of the pixel, from the start point on the retrieval line L1. In some embodiments, the line profile may be interpolated by performing a process of calculating an average, a weighted average, or the like based on the luminance value of the pixel and the luminance values of peripheral pixels. In some embodiments, the line profile may be interpolated by performing a process of calculating an average, a weighted average, or the like based on the luminance value of the pixel, the luminance values of peripheral pixels, or the like. In addition, the luminance value is not limited to a value which is extracted for each one index. In some embodiments, the luminance value may be obtained in a sub-pixel unit.

Returning to FIG. 5B, a subsequent step will be described. The cumulative line profile calculation unit 270 calculates a cumulative line profile of the retrieval line (step S402). In some embodiments, once the line profile is prepared, the cumulative line profile is calculated using the line profile.

In some embodiments, a cumulative sum is obtained for the luminance values of the line profile illustrated in FIG. 6 from the start point S toward the end point E1 for each predetermined section, for example, one pixel (e.g., one index). In some embodiments, at the start point S, the luminance value of a pixel at the start point S is a cumulative line profile value, and the cumulative line profile value in a location moved by one index on the retrieval line L1 is a value which is obtained by adding a line profile value in a location moved by one index from the start point S to the cumulative line profile value at the start point S. Moreover, the cumulative line profile value in the location moved further by one index (from the location moved by one index from the start point S) is a value obtained by adding the line profile value in a location moved by two indexes from the start point S to the cumulative line profile value in the location moved by one index from the start point S.

That is, in a case in which it is assumed that the index of the start point is 0 and the value of the luminance value of the line profile at the index i is 1 (i), the cumulative line profile value s (i) at the index i is obtained as follows:

$$s(i)=1(0)+1(1)+\ldots+1(i) \qquad \text{Equation (1)}.$$

The cumulative line profile calculation unit 270 calculates the cumulative line profile according to Equation (1). Here, the predetermined section is one index (e.g., one pixel). In some embodiments, the predetermined section may be a sub-pixel unit (e.g., a unit smaller than one pixel). In some embodiments, in a case in which the predetermined section is the sub-pixel unit, interpolation may be performed in such a way that the average or the weighted average of the luminance values of the line profile is calculated in a case in which the values of the line profile is extracted.

Figure 7A:
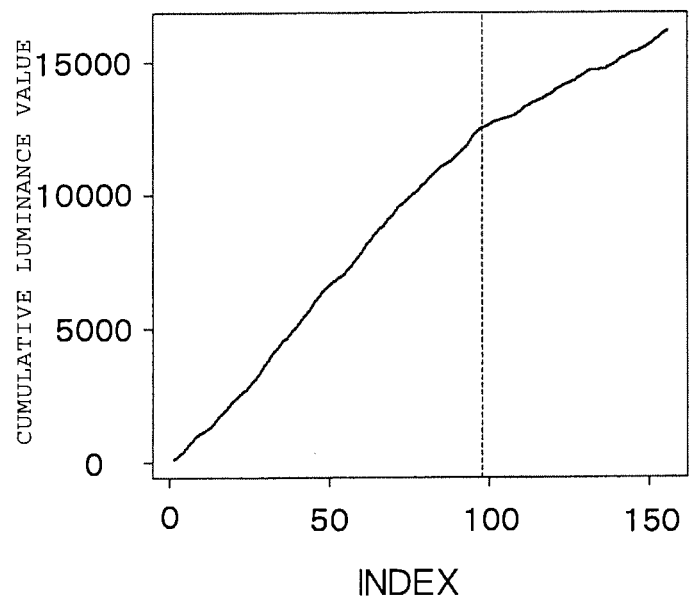
FIG. 7A and FIG. 7B are diagrams illustrating an example of the cumulative line profile.

FIG. 7A is a graph illustrating an example of the calculated cumulative line profile. A vertical axis indicates a cumulative luminance value of the cumulative line profile, and a horizontal axis indicates an index. In a case in which the cumulative sum is obtained, the fluctuation of the luminance values of the line profile illustrated in FIG. 6 is smoothed, and the change in the luminance values is schematically indicated. A dotted lined in FIG. 7A indicates a bent position.

As above, in a case in which the cumulative line profile calculation unit 270 calculates the cumulative line profile, the cumulative line profile preparing unit 26 prepares the cumulative line profile (step S40 of FIG. 3). Subsequent steps will be described after returning to FIG. 3.

In a case in which the cumulative line profile is prepared, subsequently, the edge position calculation unit 28 calculates the edge position (step S50). The calculation of the edge position is performed by calculating a bent position of the cumulative line profile illustrated in FIG. 7A. In some embodiments, the edge position calculation unit 28 calculates the edge position by obtaining a bent position at which a residual becomes minimum in such a way as to approximate a bending line using the least squares method.

Specifically, $$\epsilon(i)=s(i)-c-a(i-i0) \quad (i<i0) \qquad \text{Equation (2)}$$

$$\epsilon(i)=s(i)-c-b(i-i0) \quad (i\leq i0) \qquad \text{Equation (3)}$$

$$\text{SUM}=\epsilon(1)^2+\epsilon(2)^2+\ldots+\epsilon(i)^2 \qquad \text{Equation (4)}$$

In a case in which i changes in order of 1, 2, ..., i, it is possible to obtain the bent position i0 by calculating a, b, and c for each i using the least squares method and calculating i0 in which a residual SUM becomes minimum in a case in which a, b, and c are used. In some embodiments, the i0 in which a residual SUM becomes minimum can be obtained through sub-pixel resolution by calculating the edge position according to above Equations in such a way as to divide a section [1,i] by a value which is equal to or larger than i+1 or by performing calculation up to a desired number of digits using dichotomy or the like.

Figure 7B:
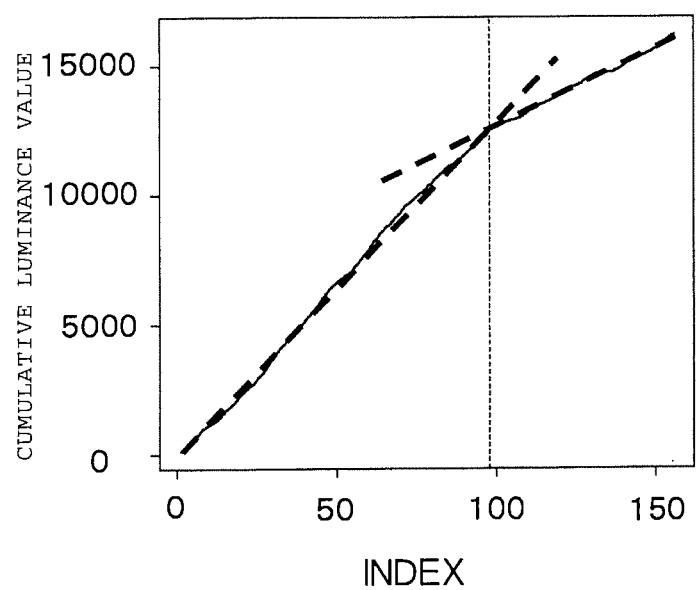

FIG. 7B illustrates a bent position which is obtained by performing the process on the cumulative line profile illustrated in FIG. 7A. A dotted lined in the drawing indicates the bent position. In some embodiments, in a case in which the cumulative line profile is divided into two parts at the bent position, angled lines are obtained by approximating the graph of the cumulative line profile by straight lines in the respective areas. As illustrated in FIG. 7B, the cumulative line profile is approximated by the straight lines in the right and left of the bent position. Referring to FIG. 4, in a case in which the edge position of one retrieval line L1, that is, a boundary point B1 of the subject is obtained, the edge data is stored in the edge data storage unit 14.

Subsequently, as illustrated in FIG. 3, it is determined whether or not the edge positions are obtained for a predetermined number of end points (step S60). In some embodiments, in a case in which a predetermined number of end points are designated, the process is performed in each of the end points, and the edge positions are calculated, the edge calculating ends (step S60: Yes).

In some embodiments, in a case in which the process is not performed on a predetermined number of end points (step S60: No), the retrieval line is changed by slightly deviating the position of the end point from the position of the end point E1, and the calculation of a subsequent edge position is performed (step S60). For example, a subsequent end point may be designated such that an angle made by the retrieval line L1 and a retrieval line which is a subsequent retrieval target is 1°. Other embodiments are not limited thereto, and another designation method may be used to acquire boundary information.

In a case in which a new retrieval line is designated, processes in step S10 to step S50 are performed on the retrieval line. That is, a boundary point on the retrieval line is obtained by calculating the edge position on the new retrieval line. In some embodiments, the steps are repeated until a predetermined number of retrieval lines are designated, and thus edge data is acquired as much as specified. For example, in the above example, edge data is calculated in each of the retrieval lines (e.g., retrieval lines having respective angles from the retrieval line L1) formed by scanning the end point by 360° for the start point S (e.g., by rotating the end point by 360° about the start point S).

The above configuration and steps may be achieved by being mounted and executed on hardware, or a computer (see FIG. 17) may be caused to execute each step by software. For example, the above configuration and steps may be mounted on Field-Programmable Gate Array (FPGA) or may be mounted on Application Specific Integrated Circuit (ASIC).

As above, in the image processing method according to some embodiments, a proper retrieval line is designated by designating a start point and an endpoint in input image data which is imaged by a SEM or a STEM and which has noise, and the bent position of the luminance value of the retrieval line is calculated as edge data, and thus it is possible to acquire boundary information of subjects which have different physical properties.

Figure 8A:
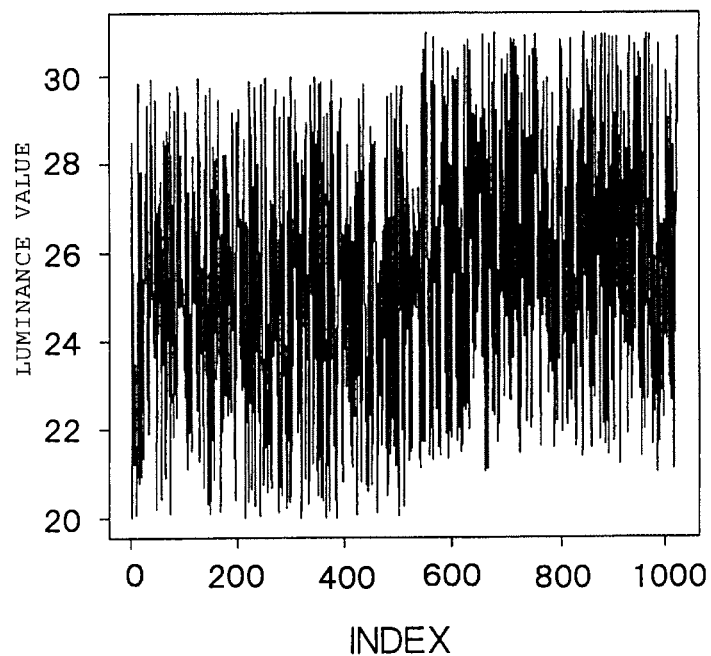
FIG. 8A and FIG. 8B are diagrams illustrating another example of the cumulative line profile.
Figure 8B:
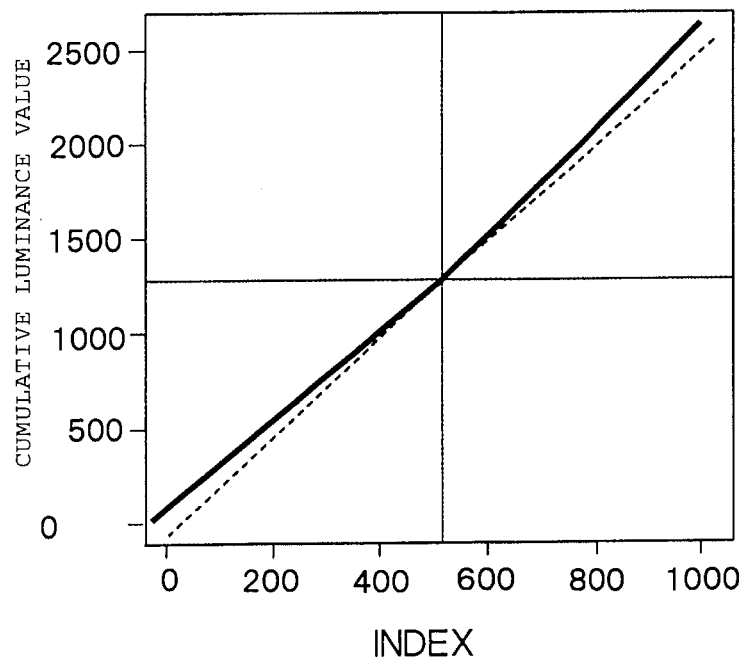

FIG. 8A and FIG. 8B are graphs illustrating the results of another experiment according to some embodiments. FIG. 8A is a graph illustrating line profile on one retrieval line of an input image in which a Signal to Noise (SN) ratio is 0.1 (=−10 dB). A horizontal axis indicates an index which is a unit on the retrieval line, and a vertical axis indicates a luminance value. In contrast, FIG. 8B is a graph illustrating a cumulative line profile which is calculated by the processes, until step S50 according to some embodiments, performed on the input image data illustrated in FIG. 8A. A horizontal axis indicates an index which is a unit on the retrieval line, and a vertical axis indicates a cumulative luminance value.

In the cumulative line profile illustrated in FIG. 8B, noise is removed and smoothed, compared to the line profile illustrated in FIG. 8A. A dotted line (vertically located around index 500; see FIG. 8B) indicates an edge position, which is obtained by applying the least squares method to the cumulative line profile, and an angled line indicates an approximate straight line in each area of the cumulative line profile which is divided by the edge position. It is possible to calculate the edge position in such a retrieval line which has considerably high noise.

Meanwhile, although an edge of two areas is obtained in some embodiments, the disclosure is not limited thereto. In some embodiments, edges between three or more areas may be obtained. In this case, similarly, the edge positions between the respective areas are extracted by calculating a bent position. In some embodiments, in a case of calculation using the least squares method, the number of areas can be used as a parameter. The number of areas may be input by a user as external input or may be automatically discriminated using another method.

In some embodiments, the line profile of the retrieval line is obtained, and a cumulative line profile is prepared based on the line profile. However, in some embodiments, the line profile is smoothed in advance before the cumulative line profile is prepared. Hereinafter, parts which are different from the above-described embodiments will be described in detail. The detailed description of components, to which the same reference numerals are attached and which have been described in the foregoing, will not be repeated.

Figure 9A:
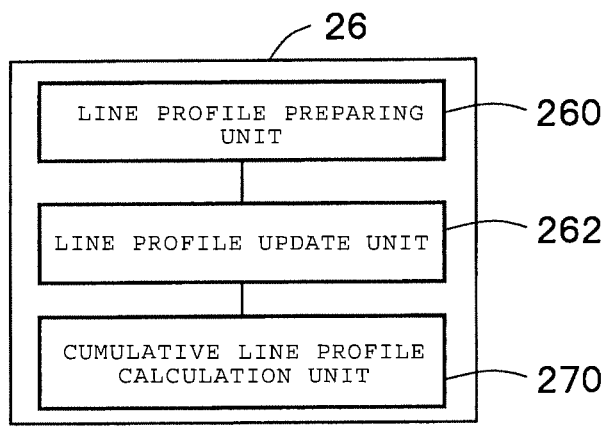
FIG. 9A is a diagram illustrating the outline of a cumulative line profile preparing unit according to some embodiments.

FIG. 9A is a block diagram illustrating the outline of the configuration of a cumulative line profile preparing unit 26 according to some embodiments. In some embodiments, the cumulative line profile preparing unit 26 includes a line profile preparing unit 260, a line profile update unit 262, and a cumulative line profile calculation unit 270.

In some embodiments, the line profile update unit 262 shares the line profile of a focused retrieval line L1 and the start point S of the retrieval line L1 (see FIG. 4), and updates the line profile of the retrieval line L1 based on the line profile of a line (hereinafter, referred to as a "neighboring retrieval line") in which one point in the vicinity of the end point E1 of the retrieval line L1 is set as an end point. In some embodiments, the cumulative line profile calculation unit 270 calculates the cumulative line profile based on the line profile which is updated by the line profile update unit 262.

Figure 9B:
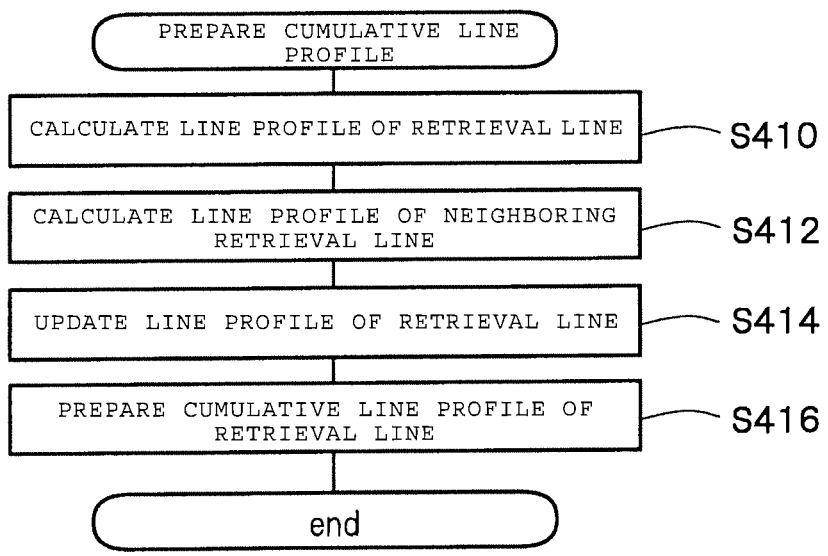
FIG. 9B is a flowchart illustrating the process thereof.
Figure 10:
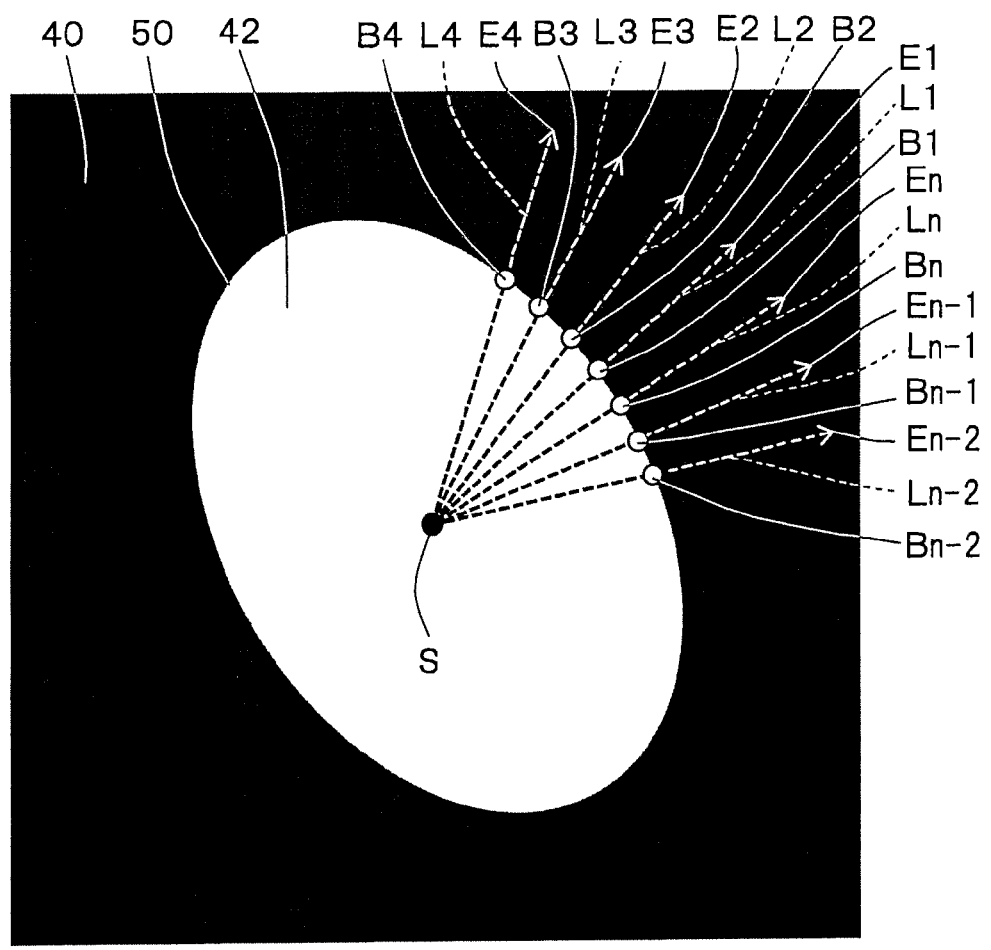
FIG. 10 is a model diagram illustrating an example of edge detection.

FIG. 9B is a flowchart illustrating the process flow of preparing a cumulative line profile according to some embodiments. In addition, FIG. 10 is a diagram illustrating an example of neighboring retrieval lines L2, . . . , Ln corresponding to a case in which a start point is set as S and the neighboring end points of the end point E1 are set as E2, E3, E4, En-2, En-1, and En in the input image 3. In addition, boundary points B2, . . . , Bn are points, which indicate the boundary between the subject 42 and the subject 40, on the neighboring retrieval lines L2, . . . , Ln. Hereinafter, the cumulative line profile preparing according to some embodiments will be described with reference to the drawings. Hereinafter, an image processing method according to some embodiments will be described with reference to FIG. 9B and FIG. 10.

Referring to FIG. 9B, first, the line profile of the focused retrieval line L1 is calculated (step S410). Since this step is the same as step S400 of FIG. 5B in some embodiments, the description thereof will not be repeated. Hereinafter, as an example, a case in which neighboring retrieval lines L2 and Ln are extracted as neighboring retrieval lines will be described. In some embodiments, a single neighboring retrieval line L2 may be extracted. In some embodiments, two or more neighboring retrieval lines, for example, four neighboring retrieval lines L2, L3, Ln-1, and Ln may be extracted.

Subsequently, the line profile preparing unit 260 calculates the line profile of the neighboring retrieval lines (step S412). For example, the line profile preparing unit 260 calculates the line profiles of the neighboring retrieval lines L2 and Ln. In some embodiments, the calculation of the line profiles of the neighboring retrieval lines L2 and Ln is performed through the same process as in the calculation of the line profile of the retrieval line L1. In some embodiments, the end points E2 and En of the respective neighboring retrieval lines L2 and Ln may be obtained using, for example, a method of designating the end point E2 to a position which is shifted by +1° from the end point E1 and designating the end point En to a position which is shifted by −1° from the end point E1 in a state in which the start point S and the lengths of the lines are fixed. Another method which is capable of appropriately obtaining the neighboring points of the end point E1 may be used.

Subsequently, the line profile update unit 262 updates the line profile of the retrieval line L1 using the respective line profiles of the retrieval line L1 and the neighboring retrieval lines L2 and Ln (step S414). As a method of updating the line profiles, for example, an average of the three line profiles may be calculated and a weighted average based on the distance or the angle from the retrieval line L1 may be calculated.

Furthermore, the cumulative line profile calculation unit 270 prepares the cumulative line profile of the retrieval line L1 using the line profile of the retrieval line L1 which is updated in step S414 (step S416). Since the procedure in which the cumulative line profile is prepared from the line profile is the same as in the procedure illustrated in FIG. 5B, the detailed description thereof will not be repeated.

As above, according to some embodiments, it is also possible to acquire boundary information of subjects, which have different physical properties, in input image data which is imaged by the SEM or the STEM and has noise. Furthermore, according to some embodiments, before the cumulative line profile is prepared, the line profile is updated based on the line profiles of the neighboring retrieval lines which neighbors with the retrieval line, with the result that noise which spatially broadens is smoothed, and thus it is possible to prepare the cumulative line profile with higher accuracy.

In some embodiments, the line profile of the retrieval line, which is obtained before update is performed, and the line profiles of the lines, which are extracted as the neighboring retrieval lines, may be stored in the data storage unit 10. In this manner, for example, in a case in which E2 is selected as a subsequent endpoint after the boundary point B1 is obtained based on the retrieval line L1, it is possible to reduce processing time using the line profiles of L1 and L2 which are calculated in advance.

In some embodiments, a cumulative line profile is prepared by calculating respective cumulative line profiles from the line profiles of a retrieval line and neighboring retrieval lines and updating the cumulative line profile of the retrieval line based on the calculated cumulative line profiles. Hereinafter, parts which are different from the above-described embodiments will be described in detail.

Figure 11A:
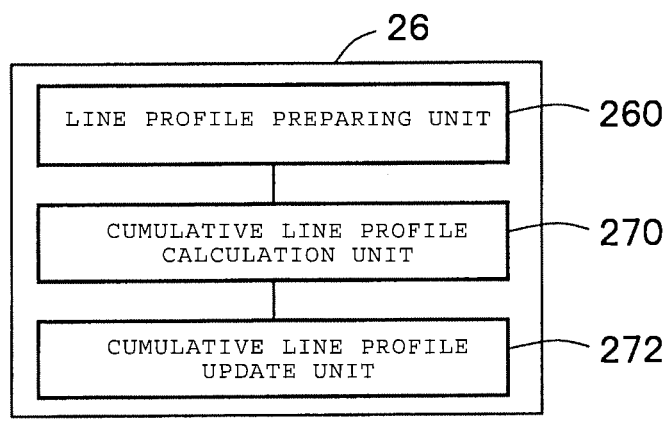
FIG. 11A is a diagram illustrating the outline of a cumulative line profile preparing unit according to some embodiments.

FIG. 11A is a block diagram illustrating the outline of a cumulative line profile preparing unit 26 according to some embodiments. The cumulative line profile preparing unit 26 includes a line profile preparing unit 260, a cumulative line profile calculation unit 270, and a cumulative line profile update unit 272. In some embodiments, the cumulative line profile update unit 272 updates the cumulative line profile of the retrieval line based on the cumulative line profile of the retrieval line and the neighboring retrieval line.

Figure 11B:
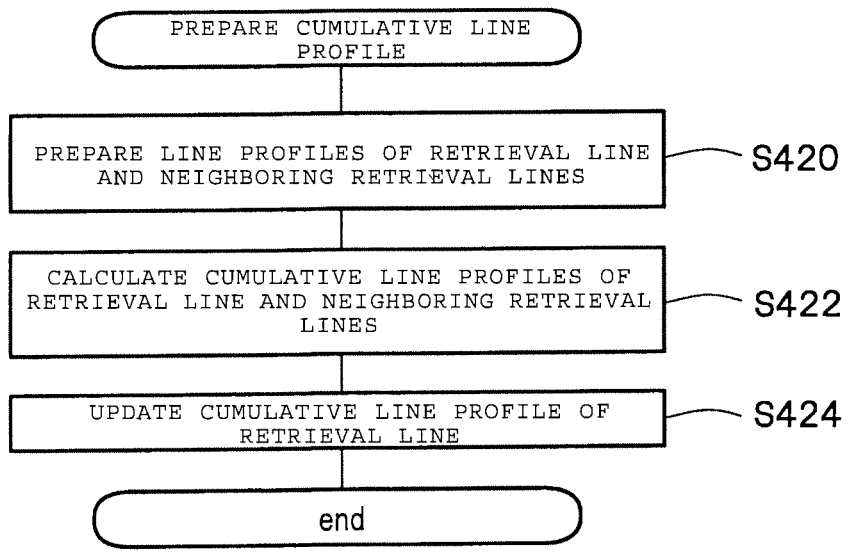
FIG. 11B is a flowchart illustrating the process thereof.

FIG. 11B is a flowchart illustrating the process flow of a cumulative line profile preparing step according to some embodiments. Hereinafter, a cumulative line profile preparing procedure will be described. In some embodiments, the retrieval line is set as L1 and the neighboring retrieval lines are set as L2 and Ln. However, other embodiments are not limited thereto.

First, the line profile preparing unit 260 prepares the line profiles of the retrieval line L1 and the neighboring retrieval lines L2 and Ln (step S420). Subsequently, the cumulative line profile calculation unit 270 calculates the cumulative line profiles of the retrieval line L1 and the neighboring retrieval lines L2 and Ln from the respective prepared line profiles (step S422).

Subsequently, the cumulative line profile update unit 272 updates the cumulative line profile of the retrieval line L1 based on the calculated cumulative line profiles of the retrieval line L1 and the neighboring retrieval lines L2 and Ln (step S424). Similarly to the update of the line profile in the above-described embodiments, in some embodiments, the update can be performed by calculating an average and calculating a weighted average. It is possible to calculate the edge position using the updated cumulative line profile as the cumulative line profile of the retrieval line L1.

As described above, according to some embodiments, it is possible to acquire the boundary information of the subjects which have different physical properties in the input image data which is imaged by the SEM or the STEM and which includes noise. By using the method illustrated in FIG. 11B, it is possible to obtain approximately the same result as that obtained by using the method illustrated in FIG. 9B. Therefore, it is also possible to appropriately select implementation of the method illustrated in FIG. 9B or the method illustrated in FIG. 11B according to the criteria of the image processing.

In the above-described embodiments, the line profile and the cumulative line profiles are updated and the edge position is obtained. However, in some embodiments, the edge position is adjusted in such a way that the position of a focused edge is updated using the calculated edge position and the calculated positions of neighboring edges. Hereinafter, parts, which are different from those in the above-described embodiments, will be described in detail.

Figure 12:
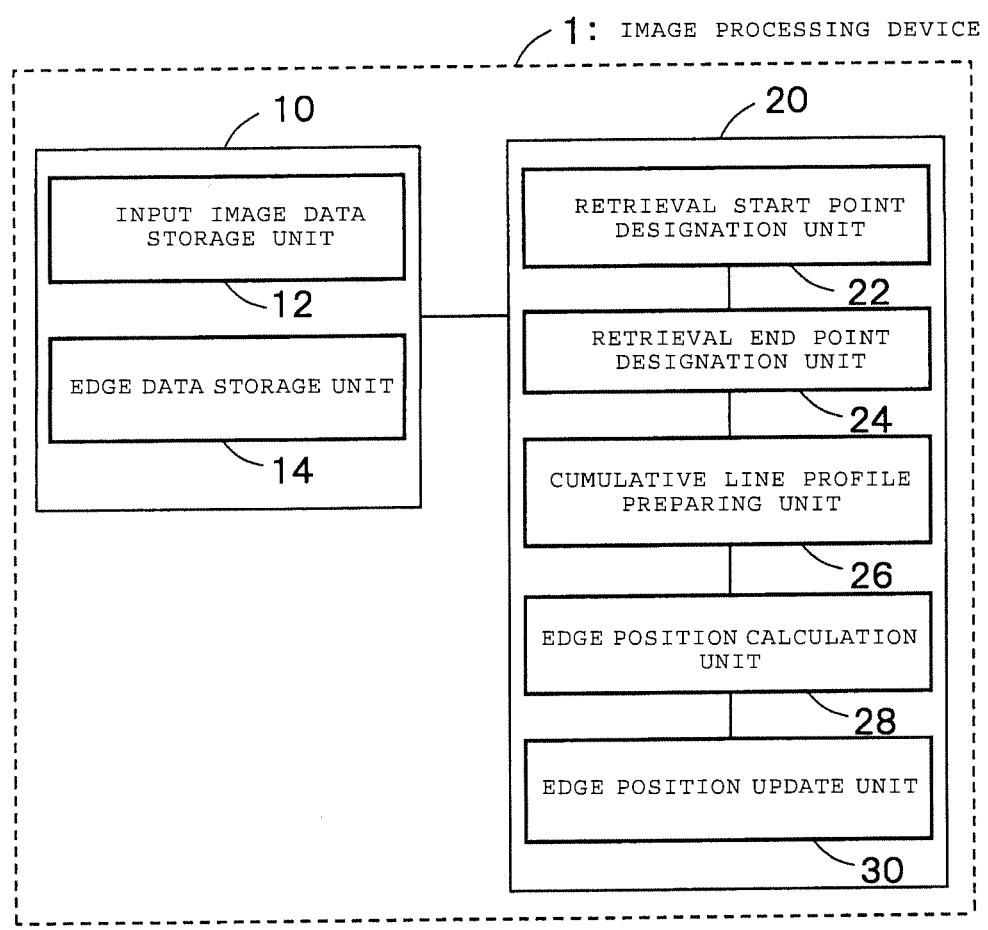
FIG. 12 is a block diagram illustrating the outline of an image processing device according to some embodiments.

FIG. 12 is a block diagram illustrating the outline of an image processing device 1 according to some embodiments. As illustrated in FIG. 12, the configuration of the image processing device 1 is similar to that of the embodiment of FIG. 1. That is, the image processing device 1 includes a data storage unit 10 and an image processing unit 20, and the data storage unit 10 includes an input image data storage unit 12 and an edge data storage unit 14.

In some embodiments, the image processing unit 20 includes a retrieval start point designation unit 22, a retrieval end point designation unit 24, a cumulative line profile preparing unit 26, and an edge position calculation unit 28, in the same manner as that of the embodiment of FIG. 1. In some embodiments, the image processing unit 20 further includes an edge position update unit 30. The edge position update unit 30 updates the edge position and stores the updated edge position in the edge data storage unit 14.

Figure 13:
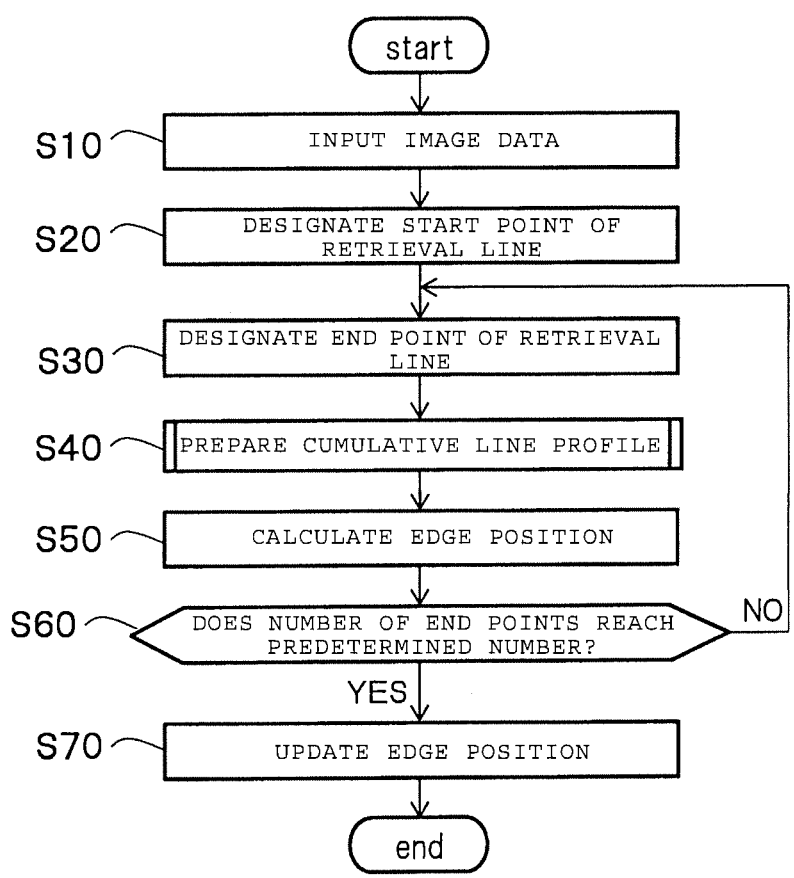
FIG. 13 is a flowchart illustrating a process of an image processing method according to some embodiments.

FIG. 13 is a flowchart illustrating the flow of a process of an image processing method according to some embodiments. Steps S10 to S60 can be the same as in the embodiment of FIG. 3.

In step S70, after a predetermined number of edge positions are calculated, the edge position update unit 30 updates the edge position based on the calculated edge positions. For example, after the edge data corresponding to 360° is calculated by every 1° in a state in which the start point S is fixed, the edge position is updated based on the obtained edge positions.

An example of the process will be described with reference to FIG. 10. It is assumed that a boundary point B1 is obtained by calculating an edge position in the retrieval line L1. In some embodiments, the edge position update unit 30 updates an edge position indicative of the boundary point B1 using the boundary point B1 and the neighboring boundary points B2 and Bn. In some embodiments, an updating method may include a method of calculating an average of coordinates which indicate a horizontal direction and a vertical direction, a method of calculating a weighted average according to the distances and the angles of the lines L1, L2, and Ln from the line L1, or another method capable of appropriately performing correction.

In some embodiments, the focused boundary point B1 may be updated using the boundary point B1 and the boundary point B2, or may be updated using four or more points such as the boundary points B1, B2, B3, Bn-1, and Bn. The update of the edge position may be performed on all the detected boundary points, or may be performed selectively on a boundary point which has a largely deviated position compared to another boundary point.

As described above, in some embodiments, it is also possible to acquire the boundary information of subjects, which have different physical properties, in the input image data which is imaged by the SEM or the STEM and which includes noise. Furthermore, according to some embodiments, it is possible to perform correction on a neighboring boundary point of a focused boundary point after a predetermined number of boundary points are extracted, and thus it is possible to further smoothly detect the boundary between subjects.

In the above-described embodiments, the cumulative line profiles are prepared by designating a retrieval line. Here, a method of collectively preparing cumulative line profiles in all directions according to some embodiments will be described. In some embodiments, cumulative line profiles in all directions are prepared by operating the cumulative sum centering on the start point S of an input image and preparing cumulative sum data.

Figure 14A:
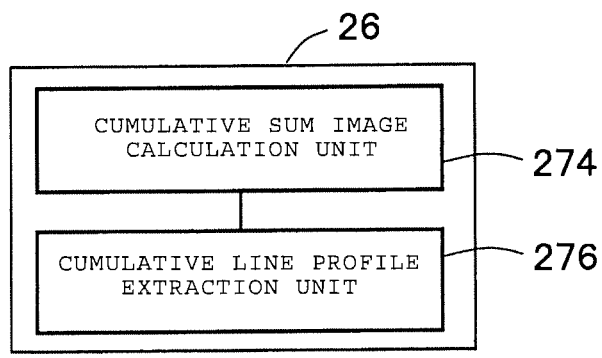
FIG. 14A is a diagram illustrating the outline of a cumulative line profile preparing unit according to some embodiments.

FIG. 14A is a block diagram illustrating the outline of a cumulative line profile preparing unit 26 according to some embodiments. As illustrated in FIG. 14A, the cumulative line profile preparing unit 26 includes a cumulative sum image calculation unit 274 and a cumulative line profile extraction unit 276.

In some embodiments, the cumulative sum image calculation unit 274 calculates the cumulative sum from the start point S toward the edge direction of the input image, and calculates the cumulative sum image in which the value of the cumulative sum is used as the luminance values of pixels. In some embodiments, the cumulative line profile extraction unit 276 extracts the cumulative line profile of a retrieval line by extracting the luminance values of the respective pixels of the cumulative sum image.

Figure 14B:
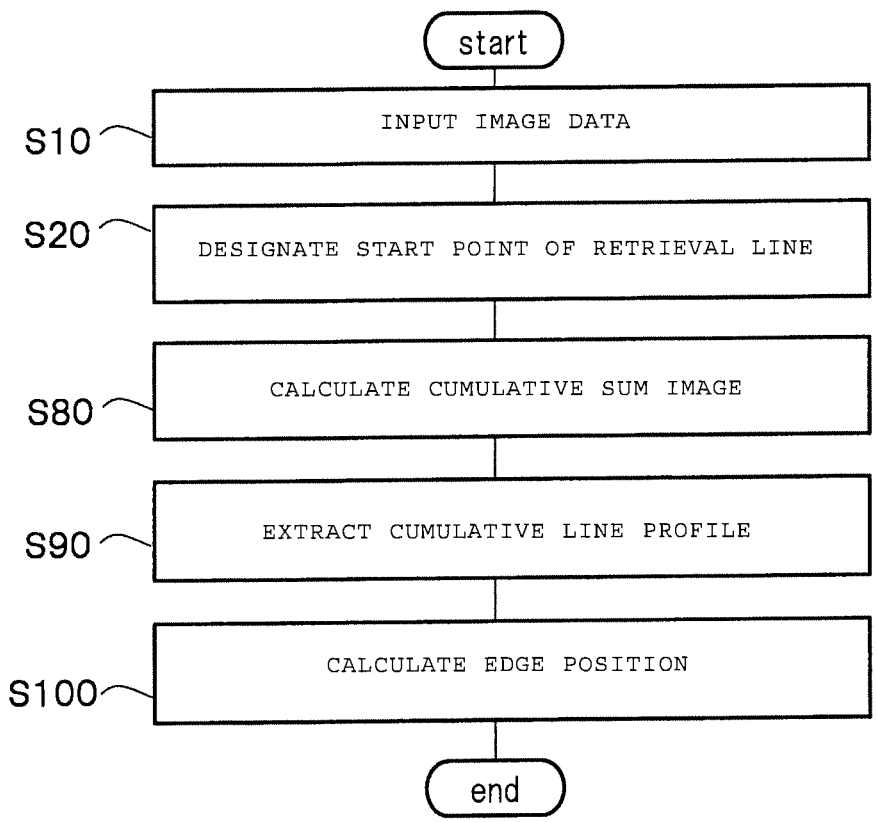
FIG. 14B is a flowchart illustrating the flow of an image process.

FIG. 14B is a flowchart illustrating the flow of the process of the image processing method according to some embodiments. As an example, a process of preparing a cumulative sum image for the model diagram illustrated in FIG. 10 will be described.

First, image data, which is imaged by the imaging device 2, is input to the image processing device 1 as the input image data (step S10). In this case, the image of the input image 3 of FIG. 10 is input as the input image data. Subsequently, the start point S is designated similarly to that depicted in FIG. 10 (step S20). In some embodiments, the start point S is a pixel which is the reference of the cumulative sum image.

Subsequently, the cumulative sum image calculation unit 274 calculates the cumulative sum image (step S80). As an example, a case in which four-connected pixels centering on the start point S are considered will be described. FIG. 15A, FIG. 15B, FIG. 15C and FIG. 15D are schematic diagrams illustrating a procedure in which the cumulative sum image is prepared.

Figure 15A:
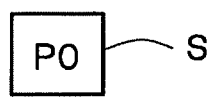
Figure 15B:
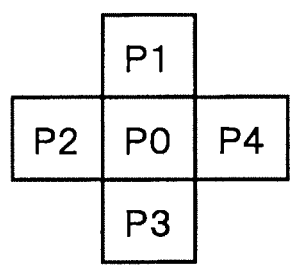

First, the data of the input image is copied as the cumulative sum image. As illustrated in FIG. 15A, the luminance value of the start point S is set as P0. As illustrated in FIG. 15E, in some embodiments, in a case in which the luminance value of a pixel which is adjacent to the start point S is set as P1, update is performed in such a way that P1=P1+P0. Similarly, the luminance values of adjacent pixels of the start point S in the vertical and horizontal directions are calculated in such a way that P2=P2+P0, P3=P3+P0, and P4=P4+P0.

Figure 15C:
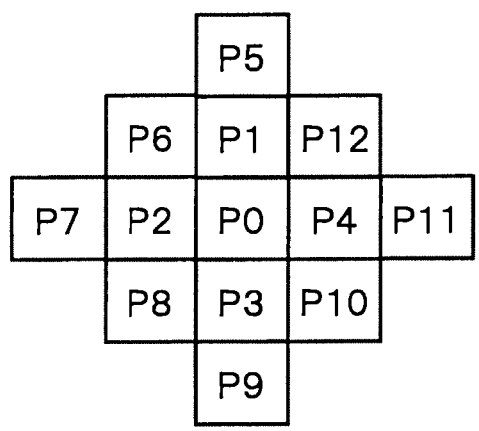

Subsequently, as illustrated in FIG. 15C, pixel values are further obtained through four connections. That is, the pixel value P5 of a pixel adjacent to P1 is updated in such a way that P5=P5+P1. Furthermore, update is performed in such a way that P6=P6+P1+P2−P0, P7=P7+P2, and P8=P8+P2+P3−P0, . . . .

Subsequently, as illustrated in FIG. 15D, a pixel value on the further outside of FIG. 15C is obtained through four-connection. That is, update is performed in such a way that P13=P13+P5, P14=P14+P5+P6−P1, and P15= . . . .

As above, the cumulative sum image calculation unit sequentially obtains the cumulative sum from the start point S toward the end of the image, and calculates the cumulative sum image. Meanwhile, although four connection is exemplified in the above description (see FIGS. 15A-15D), in some embodiments, the cumulative sum may be calculated through eight connection, and the weighted sum of pixel values of adjacent pixels may be obtained based on the horizontal axis and the vertical axis, the angle between the start point and the focused pixel, and the distance from the start point S. In some embodiments, an input image is copied for processing. In some embodiments, in a case in which it is desired to shorten time which is taken to copy an image, the pixel values of the respective pixels of the cumulative sum image may be calculated while referring to the pixel values of the input image without copying the input image.

FIG. 16 is a diagram illustrating a cumulative sum image 4, which is calculated for the model illustrated in FIG. 10, as an example. As illustrated in FIG. 16, a cumulative sum image is obtained in which a pixel value becomes high (e.g., bright) from the start point S toward the boundary and a density of an increasing pixel value becomes low over a boundary 50.

Referring to FIG. 14B, in a case in which the cumulative sum image is calculated, the cumulative line profile extraction unit 276 extracts the cumulative line profiles (step S90). In some embodiments, in a case in which the line profiles of the cumulative sum image are extracted with regard to a certain retrieval line, it is possible to extract the cumulative line profiles of the input image of the retrieval line. That is, in some embodiments, in a case in which the line profile preparing unit 260 performs a procedure, which is the same as the procedure in which the line profile of the retrieval line is prepared, on the cumulative sum image, it is possible for the cumulative line profile extraction unit 276 to extract the cumulative line profiles. Furthermore, in a case in which the edge positions of the extracted cumulative line profiles are calculated (step S100), it is possible to obtain the boundary point in the input image.

As described above, in some embodiments, it is also possible to calculate the boundary of the input image by calculating the edge positions of the cumulative line profiles in the input image data which is imaged by the SEM or the STEM and which includes noise. Furthermore, it is possible to extract the cumulative line profiles by calculating the cumulative sum image 4.

Figure 17:
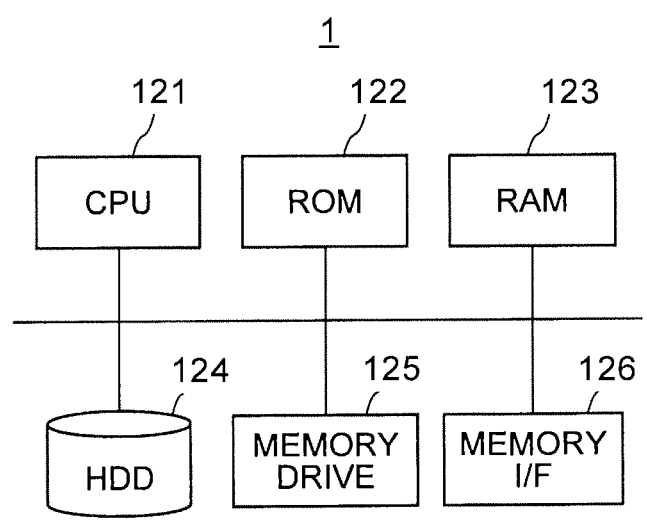
FIG. 17 is a block diagram illustrating a configuration of an image processing device of FIG. 1.

FIG. 17 is a block diagram illustrating a configuration of the image processing device 1 of some embodiments, such as the image processing device 1 of FIG. 1.

In some embodiments, the image processing device 1 includes a processor (e.g., a central processing unit (CPU)) 121, a read only memory (ROM) 122, a random access memory (RAM) 123, a hard disk drive (HDD) 124, a memory drive 125 such as a compact disc (CD) drive and a digital versatile disk (DVD) drive, and a memory interface (I/F) 126 such as a memory port and a memory slot. Functions of the image processing device 1 of some embodiments may be implemented as instructions stored in one or more memories (or other non-transitory computer-readable storage media) and executable by the processor 121.

While certain embodiments have been described, these embodiments have been presented by way of example only, and are not intended to limit the scope of the present disclosure. Indeed, the embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure. Moreover, some or all of the above-described embodiments can be combined when implemented.

What is claimed is:

1. An image processing method comprising:
designating one point on input image data as a start point of a retrieval line, the input image data containing an image of a subject;
designating one point, which is different from the start point, on the input image data as an end point of the retrieval line;
preparing a cumulative line profile of the retrieval line by calculating a cumulative sum of luminance values on the retrieval line, and extracting luminance values of the retrieval line based on the cumulative line profile;
calculating an edge position on the retrieval line based on the cumulative line profile of the retrieval line, the edge position corresponding to a boundary of the subject in the input image data; designating a predetermined number of end points; and calculating a predetermined number of edge positions based on respective cumulative line profiles which connect the start point to the predetermined number of end points.

2. The method according to claim 1,
wherein the preparing the cumulative line profile of the retrieval line comprises:
preparing a line profile obtained by extracting the luminance values on the retrieval line; and
calculating the cumulative line profile of the retrieval line, in which the cumulative sum of the luminance values of the line profile of the retrieval line is operated, for each predetermined section from the start point toward the end point.

3. The method according to claim 2,
wherein the preparing the cumulative line profile of the retrieval line further comprises:
updating the line profile of the retrieval line based on the line profile of the retrieval line and line profiles of one or more neighboring retrieval lines which connect one or more neighboring points of the end point to the start point; and
calculating the cumulative line profile of the retrieval line based on the updated line profile of the retrieval line.

4. The method according to claim 2,
wherein the preparing the cumulative line profile of the retrieval line further comprises:
updating the cumulative line profile of the retrieval line based on the cumulative line profile of the retrieval line and cumulative line profiles of one or more neighboring retrieval lines which connect one or more neighboring points of the end point to the start point; and
calculating the edge position on the retrieval line based on the updated cumulative line profile of the retrieval line in a case in which the edge position is calculated.

5. The method according to claim 1, further comprising:
updating a focused edge position based on the focused edge position and edge positions which neighbor on the focused edge from among a predetermined number of calculated edge positions.

6. The method according to claim 1,
wherein the preparing the cumulative line profile of the retrieval line comprises:
calculating a cumulative sum image by sequentially operating a cumulative sum of pixel values from the start point toward an end portion of the input image data; and
extracting the luminance values of the retrieval line in the cumulative sum image.

7. The method according to claim 1,
wherein the calculating the edge position on the retrieval line comprises:
calculating a changing point at which a slope of the cumulative line profile of the retrieval line changes; and
setting the changing point as the edge position.

8. A non-transitory computer-readable storage medium storing instructions as an image processing program executable by a processor to:
store input image data, which is imaged by an imaging device, in a storage device, the input image data containing an image of a subject;
designate one point on the input image data as a start point of a retrieval line;
designate one point, which is different from the start point, on the input image data as an end point of the retrieval line;
prepare a cumulative line profile of the retrieval line based on luminance values on the retrieval line and extract luminance values of the retrieval line based on the cumulative line profile;
calculate an edge position on the retrieval line based on the cumulative line profile of the retrieval line;
store the calculated edge position in the storage device;
detect a boundary of the subject in the input image data based on the calculated edge position; designating a predetermined number of end points; and calculating a predetermined number of edge positions based on the respective cumulative line profiles which connect the start point to the predetermined number of end points.

9. The non-transitory computer-readable storage medium according to claim 8,
wherein the instructions to prepare the cumulative line profile of the retrieval line comprises instructions to:
prepare a line profile obtained by extracting the luminance values on the retrieval line; and
calculate the cumulative line profile of the retrieval line, in which the cumulative sum of the luminance values of the line profile of the retrieval line is operated, for each predetermined section from the start point toward the end point.

10. The non-transitory computer-readable storage medium according to claim 9,
wherein the instructions to prepare the cumulative line profile of the retrieval line further comprises instructions to:
update the line profile of the retrieval line based on the line profile of the retrieval line and line profiles of one or more neighboring retrieval lines which connect one or more neighboring points of the end point to the start point; and
calculate the cumulative line profile of the retrieval line based on the updated line profile of the retrieval line.

11. The non-transitory computer-readable storage medium according to claim 9,
wherein the instructions to prepare the cumulative line profile of the retrieval line further comprises instructions to:
update the cumulative line profile of the retrieval line based on the cumulative line profile of the retrieval line and cumulative line profiles of one or more neighboring retrieval lines which connect one or more neighboring points of the end point to the start point; and
calculate the edge position on the retrieval line based on the updated cumulative line profile of the retrieval line in a case in which the edge position is calculated.

12. The non-transitory computer-readable storage medium according to claim 8, further comprising instructions to:
update a focused edge position based on the focused edge position and edge positions which neighbor on the focused edge from among a predetermined number of calculated edge positions.

13. An image processing device comprising a processor and a memory connected to the processor, the memory storing instructions executable by the processor to:
designate one point on input image data as a start point of a retrieval line, the input image data containing an image of a subject;
designate one point, which is different from the start point, on the input image data as an endpoint of the retrieval line;
prepare a cumulative line profile of the retrieval line by calculating a cumulative sum of luminance values on the retrieval line and extract luminance values of the retrieval line based on the cumulative line profile;
calculate an edge position on the retrieval line based on the cumulative line profile of the retrieval line;
detect a boundary of the subject in the input image data based on the calculated edge position; designating a predetermined number of end points; and calculating a predetermined number of edge positions based on respective cumulative line profiles which connect the start point to the predetermined number of end points.

14. The image processing device according to claim 13,
wherein the memory further storing instructions executable by the processor to:
prepare a line profile obtained by extracting the luminance values on the retrieval line; and
calculate the cumulative line profile of the retrieval line, in which the cumulative sum of the luminance values of the line profile of the retrieval line is operated, for each predetermined section from the start point toward the end point.

15. The image processing device according to claim 14,
wherein the memory further storing instructions executable by the processor to:
update the line profile of the retrieval line based on the line profile of the retrieval line and line profiles of one or more neighboring retrieval lines which connect one or more neighboring points of the end point to the start point; and
calculate the cumulative line profile of the retrieval line based on the updated line profile of the retrieval line.

16. The image processing device according to claim 14,
wherein the memory further storing instructions executable by the processor to:
update the cumulative line profile of the retrieval line based on the cumulative line profile of the retrieval line and cumulative line profiles of one or more neighboring retrieval lines which connect one or more neighboring points of the end point to the start point; and
calculate the edge position on the retrieval line based on the updated cumulative line profile of the retrieval line in a case in which the edge position is calculated.

17. The image processing device according to claim 13, wherein the memory further storing instructions executable by the processor to:
update a focused edge position based on the focused edge position and edge positions which neighbor on the focused edge from among a predetermined number of calculated edge positions.

* * * * *